(No Model.)

W. L. JENKINS.
STENOGRAPHER'S PRACTICE SHEET.

No. 356,474. Patented Jan. 25, 1887.

*a* If I should not, and if this were the last, or to be among the last, of all the occasions in which I am to appear before any great number of the people of this country, I shall not regret that that appearance was here.

Witnesses
Fred L. Emery.
John F. C. Prentiss

Inventor
William L. Jenkins.
By Crosby & Gregory
attys.

UNITED STATES PATENT OFFICE.

WILLIAM L. JENKINS, OF BOSTON, MASSACHUSETTS.

STENOGRAPHER'S PRACTICE-SHEET.

SPECIFICATION forming part of Letters Patent No. 356,474, dated January 25, 1887.

Application filed October 6, 1886. Serial No. 215,466. (No model.)

*To all whom it may concern:*

Be it known that I, WILLIAM L. JENKINS, of Boston, county of Suffolk, and State of Massachusetts, have invented an Improvement in Stenographers' Practice Sheets, of which the following description, in connection with the accompanying drawing, is a specification, like letters on the drawing representing like parts.

This invention has for its object to provide a tablet or sheet for stenographic students to practice upon in the attainment of speed.

In United States Letters Patent No. 342,182, granted to me May 18, 1886, a tablet or chart was shown and described composed of pages of printed matter, printed in very small type, the lines being spaced a considerable distance apart, such a printed line being used as a ruled line upon which to print the stenographic characters. A key was also preferably employed, to which the student could refer when necessary to ascertain how to write a certain character or to verify his writing.

In accordance with this my present invention a similar printed line is employed; but, as is well known, many phrases occur composed of two or three, and oftentimes more, words which may be coupled together in one stenographic character, and it is only necessary to indicate to the student when a single stenographic character should be employed for such a phrase without the necessity of obliging him to refer to the key; and to provide such means is the prime object of this invention.

Means are also shown for indicating the speed at which the student is writing.

The drawing shows a portion of a tablet or chart having matter printed thereon in very small type, and having means for indicating when to write two or more words with one stenographic character, and also means for indicating the speed of the writer.

The tablet or sheet has printed upon it, in very small type—as, for instance, that known to the trade as "pearl" type—any discourse, proceeding, or other matter desired, one sentence being herein shown, as at *a*.

Each line is spaced a considerable distance from the others, so that the printed line may be used just as a ruled line upon which to write stenographic characters, leaving ample space to employ the various positions in which the characters are to be written, both above and below the line.

As it is customary in stenography to couple two or more words together in one character frequently—such, for instance, as phrases of common and frequent occurrence—it is necessary that the student should become exceedingly familiar with all such phrases and the correct character for the phrase, and to aid the student in this respect I have placed between the words composing the phrase a dot, as at 2, which indicates that the words connected by the dot should be coupled in one stenographic character.

By indicating means, as shown, or of a like nature the student soon familiarizes himself with all the well-known phrases without the necessity of referring to a key to know just how many words he can couple together, and whenever such a phrase occurs he is notified at once that he should write the same with one character, thereby avoiding incorrect writing from the start.

Instead of employing a dot, as herein shown, a hyphen or bracket or, in fact, any other suitable sign may be employed to indicate the coupling together of the words to be written with one stenographic character.

To indicate to the student how fast he is writing, the number of words is designated by a figure at intervals along the line, as at 3, and by properly timing himself he can tell just how many words per minute he is writing without the necessity of spending the time to count the words.

I claim—

1. The herein-described stenographic practice-sheet, which consists of a series of lines printed in very small type and spaced a considerable distance apart to form a line which may be employed as a ruled line upon which to write the stenographic characters, and having means connecting two or more of the words contained in the printed line to indicate that such words coupled together should be written by a single stenographic character, substantially as described.

2. The herein-described stenographic practice-sheet, which consists of a series of lines printed in a very small type, spaced a considerable distance apart, and having numbers printed at intervals on the lines to indicate the number of words contained therein, substantially as described.

3. The herein-described stenographic practice-sheet, which consists of a series of lines printed in very small type, spaced a considerable distance apart, having means for connecting two or more of the words contained in a printed line to indicate that such words should be coupled together in one stenographic character, and also having numbers printed at intervals along the lines to indicate the number of words, substantially as described.

In testimony whereof I have signed my name to this specification in the presence of two subscribing witnesses.

WILLIAM L. JENKINS.

Witnesses:
 B. J. NOYES,
 FRED L. EMERY.